US008447601B2

(12) United States Patent
Wang

(10) Patent No.: US 8,447,601 B2
(45) Date of Patent: May 21, 2013

(54) METHOD AND DEVICE FOR TRACKING BACKGROUND NOISE IN COMMUNICATION SYSTEM

(75) Inventor: Zhe Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/325,985

(22) Filed: Dec. 14, 2011

(65) Prior Publication Data

US 2012/0084085 A1 Apr. 5, 2012

Related U.S. Application Data

(63) Continuation of application No. 13/116,323, filed on May 26, 2011, now Pat. No. 8,095,361, which is a continuation of application No. PCT/CN2010/077777, filed on Oct. 15, 2010.

(30) Foreign Application Priority Data

Oct. 15, 2009 (CN) .......................... 2009 1 0205300

(51) Int. Cl.
*G10L 15/20* (2006.01)
*G10L 21/02* (2006.01)

(52) U.S. Cl.
USPC ........................................... 704/233; 704/226

(58) Field of Classification Search
USPC .......................................... 704/226–228, 233
See application file for complete search history.

(56) References Cited

U.S. PATENT DOCUMENTS 5,450,484 A 9/1995 Hamilton
5,659,622 A 8/1997 Ashley
6,122,610 A 9/2000 Isabelle (Continued)

FOREIGN PATENT DOCUMENTS

CN 1617606 A 5/2005
CN 1623186 A 6/2005

(Continued)

OTHER PUBLICATIONS

3rd Generation Partnership Project; Technical Specification Group Services and System Aspects; Mandatory Speech Codec Processing Functions; Adaptive Multi-Rate (AmR) Speech Codec; Voice Activity Detector (VAD); Release 6; 3GPP TS 26.094 v6.1.0, (Jun. 2006).*

(Continued)

*Primary Examiner* — Angela A Armstrong
(74) *Attorney, Agent, or Firm* — Brinks Hofer Gilson & Lione

(57) ABSTRACT

A method and a device for tracking background noise in a communication system are provided. The method includes: calculating a SNR of a current frame according to input audio signals; increasing a frame counter, and calculating tone features and signal steadiness features of the current frame if the SNR of the current frame is not less than a first threshold; determining the possibility of a time window including a noise interval according to the calculated tone feature values and signal steadiness feature values of each frame of the time window when the frame counter is increased to the length of the time window; and extracting noise features in the time window. Existence of background noise is analyzed continuously in a time window, so that background noise that changes frequently.

17 Claims, 6 Drawing Sheets

U.S. PATENT DOCUMENTS

| | | | |
|---|---|---|---|
| 6,453,285 | B1 | 9/2002 | Anderson et al. |
| 6,662,155 | B2 | 12/2003 | Rotola-Pukkila et al. |
| 7,487,084 | B2 | 2/2009 | Aaron et al. |
| 2003/0177007 | A1 | 9/2003 | Kanazawa et al. |
| 2003/0236672 | A1 | 12/2003 | Aaron et al. |
| 2004/0260547 | A1 | 12/2004 | Cohen et al. |
| 2007/0147285 | A1 | 6/2007 | Jin et al. |
| 2007/0265842 | A1 | 11/2007 | Jarvinen et al. |
| 2010/0088094 | A1 | 4/2010 | Wang |

FOREIGN PATENT DOCUMENTS

| | | | |
|---|---|---|---|
| CN | 1802694 | A | 7/2006 |
| CN | 101197130 | A | 6/2008 |
| CN | 101320559 | A | 12/2008 |
| CN | 101320563 | A | 12/2008 |
| CN | 102044241 | B | 4/2012 |
| EP | 1116224 | A1 | 7/2007 |
| GB | 2384670 | B | 2/2004 |
| KR | 2006-0134882 | A | 12/2006 |
| WO | WO 2007091956 | A2 | 8/2007 |
| WO | WO 2008067719 | A1 | 6/2008 |
| WO | WO 2008148321 | A1 | 12/2008 |
| WO | WO 2009027936 | A2 | 3/2009 |

OTHER PUBLICATIONS

Foreign Communication from a Related Counterpart Application, PCT Application No. PCT/CN2010/077777, Partial English Translation of Written Opinion dated Jan. 6, 2011, 4 pages.
Foreign Communication from a Related Counterpart Application, PCT Application No. PCT/CN2010/077777, International Search Report dated Jan. 6, 2011, 4 pages.
ITU-T, "Series G: Transmission Systems and Media, Digital Systems and Networks, Digital Terminal Equipments-Coding of Voice and Audio Signals," G 720.1, Jan. 2010, 26 pages.
3rd Generation Partnership Project, Technical Specification Group Services and System Aspects; Mandated Speech Codec Process Functions; Adaptive Multi-Rate (AmR) Speech Codec; Voice Activity Detector (VAD)I Release 6; 3GPP TS26.094 v6.10, (Jun. 2006).
Extended European Search Report issued in corresponding European Patent Application No. 10823082.2, mailed Mar. 12, 2012.
3GPP, "Digital Cellular Telecommunications System (Phase 2+); Universal Mobile Telecommunications System (UMTS); LTE; Mandatory Speech Codec Speech Processing Functions; Adaptive Multi-Rate (AMR) Speech Codec; Voice Activity Detector (VAD)" (3GPP TS 26.094 version 8.0.0 Release 8) ETSI TS 126 084. V8.0.0, Jan. 2009.

* cited by examiner

METHOD AND DEVICE FOR TRACKING BACKGROUND NOISE IN COMMUNICATION SYSTEM

CROSS-REFERENCE TO RELATED APPLICATIONS

This application is a continuation of U.S. patent application Ser. No. 13/116,323, filed on May 26, 2011, which is a continuation of International Application No. PCT/CN2010/077777, filed on Oct. 15, 2010, which claims priority to Chinese Patent Application No. 200910205300.2, filed on Oct. 15, 2009, both of which are hereby incorporated by reference in their entireties.

FIELD

The present disclosure relates to the field of communications, and in particular, to a method and a device for tracking background noise in a communication system.

BACKGROUND

In a voice communication system, by using a Voice Activity Detection (VAD) technology, the time when a voice is activated is known, so that signals are transmitted only when the voice is in an activated state, thus effectively saving bandwidth resources. In addition, because in the voice communication system, a voice signal input by a speaker to a terminal usually includes background noise, by using a Noise Suppression (NS) technology, the background noise included in the voice can be effectively reduced or suppressed, thus significantly improving experience of a listener.

In VAD, determining whether a current signal is voice or not in essence depends on whether features of the current signal are closer to features of background noise or closer to features of a voice, and the current signal belongs to the one whose features are closer to the features of the current signal. In NS, in order to reduce an effect background noise imposes on a voice, some features of the current background noise are also required to be known, so that the features can be removed from a voice signal, thus suppressing the noise. Both the VAD and the NS involve a key technology, that is, background noise tracking.

Currently, a widely used background noise tracking technology is a background noise tracking technology used in Audio/Modem Riser VAD2. According to the technology, a Signal to Noise Ratio (SNR) of a current frame is calculated. If the SNR is small, and is lower than a background noise threshold, the current frame is determined as a background noise frame; if the SNR is not lower than a background noise threshold, pitch and tone features of the current frame are detected. If the current frame has the pitch and tone features, a hysteresis counter is increased by 1; otherwise, spectrum fluctuations of the current frame and several adjacent frames before the current frame are further calculated. If the spectrum fluctuation of the current frame is violent, and exceeds a threshold, it is determined that the current frame may not be a noise frame, and the hysteresis counter is increased by 1; otherwise, it is determined that the current frame may be a noise frame, and a continuous noise frame counter is increased by 1. If the continuous noise frame counter reaches 50 frames, it can be determined that the current frame shall be a background noise frame. In addition, during increasing of the continuous noise frame counter, a small number of undetermined frames are allowed (represented by the hysteresis counter). When the continuous noise frame counter reaches 50 frames, and if the hysteresis counter is not greater than 6 (that is, the number of the undetermined frames is not greater than 6), the current frame is determined as a noise frame, that is the determination of the current noise frame is not affected in this case. If the hysteresis counter exceeds 6 frames during the increasing of the continuous noise frame counter, the continuous noise frame counter is reset, and a current signal is not determined as background noise.

However, the above background noise tracking technology has a drawback on tracking speed. When a sudden change happens to background noise (a change leading to increasing of the SNR, for example, a sudden rise of a noise level), a noise signal cannot be identified by using the SNR and a background noise threshold, and the identification can only be performed when 50 continuous noise frames emerge, thus resulting in the slow tracking. If a person speaks at a high frequency, the requirement of the 50 noise frames cannot be met, and the AMR VAD2 cannot track the background noise. Additionally, the above background noise tracking technology has a drawback on tracking accuracy. Because many music signals do not have obvious pitch and tone features, if the condition that the continuous noise frame counter is greater than or equal to 50 and the hysteresis counter is not greater than 6 is followed, some music signals are mistakenly determined as background noise.

SUMMARY

The embodiments of the present disclosure provide a method and a device for tracking background noise in a communication system, so as to increase background noise tracking speed and improve background noise tracking accuracy. The technical solutions of the present disclosure are as follows:

An embodiment of the present disclosure provides a method for tracking background noise in a communication system. The method includes: calculating an SNR of a current frame according to input audio signal; increasing a frame counter cnt2 and calculating tone features and signal steadiness features of the current frame if the SNR of the current frame is greater than or equal to a first threshold; determining the possibility of a time window including a noise interval according to the calculated tone feature values and signal steadiness feature values of each frame of the time window, when the frame counter cnt2 is increased to the length of the time window; and extracting noise features in the time window according to the determined possibility of the time window including a noise interval.

An embodiment of the present disclosure provides a device for tracking background noise in a communication system. The device includes: a first processing module, configured to calculate an SNR of a current frame according to input audio signals; a second processing module, configured to increase a frame counter cnt2 and calculate tone features and signal steadiness features of the current frame if the SNR of the current frame is greater than or equal to a first threshold; a third processing module, configured to determine the possibility of a time window including a noise interval according to the calculated tone feature values and signal steadiness feature values of each frame of the time window, when the frame counter cnt2 is increased to the length of the time window; and a fourth processing module, configured to extract noise features in the time window according to the determined possibility of the time window including a noise interval.

Beneficial effects of the technical solutions according to the embodiments of the present disclosure are as follows: existence of background noise is analyzed continuously in a time window of a certain length, so that background noise that changes frequently and dramatically can be detected or tracked rapidly. Meanwhile, tone features, spectrum peak position steadiness, and maximum Peak to Valley Ratio (PVR) position steadiness are detected, thus significantly reducing miss-tracking phenomenon of background noise in music signals.

BRIEF DESCRIPTION OF THE DRAWINGS

To illustrate the technical solutions according to the embodiments of the present disclosure or in the prior art more clearly, the accompanying drawings for describing the embodiments or the prior art are introduced in the following. Apparently, the accompanying drawings in the following description are only some embodiments of the present disclosure, and persons of ordinary skill in the art can derive other drawings from the accompanying drawings without creative efforts.

DETAILED DESCRIPTION OF THE EMBODIMENTS

In order to make the objectives, technical solutions, and advantages of the present disclosure more comprehensible, embodiments of the present disclosure are described in further detail below with reference to the accompanying drawings.

Embodiment 1

Persons skilled in the art may know that performance of a background noise tracking technology can be evaluated by two indicators: tracking speed and tracking accuracy. The tracking speed refers to a distance between a time when a background noise signal is identified and a time when the signal is actually generated, and shorter distance indicates higher tracking speed. The tracking accuracy refers to a background noise signal and a non-background noise signal that can be accurately identified, and feature parameters are further extracted from the background noise signal only.

As stated above, conventional noise tracking techniques usually have drawbacks on the tracking accuracy and the tracking speed. The drawback of the tracking speed is mainly as follows: When background noise changes dramatically, the conventional noise tracking techniques need a long period of time for tracking. Only when the background noise is steady, and after the background noise lasts for a long period of time, can the conventional noise tracking techniques effectively perform tracking. The drawback of the tracking accuracy is mainly as follows: When music signals exist, because many music signals do not have obvious pitch and tone features, the conventional background noise tracking techniques mistake this kind of music signals for noise to track. It should be specially noted that, the music signals without the obvious pitch and tone features herein are a general reference. All transmitted signals except voice signals and background noise signals that do not have the obvious pitch and tone features can be called music signals.

Figure 1:
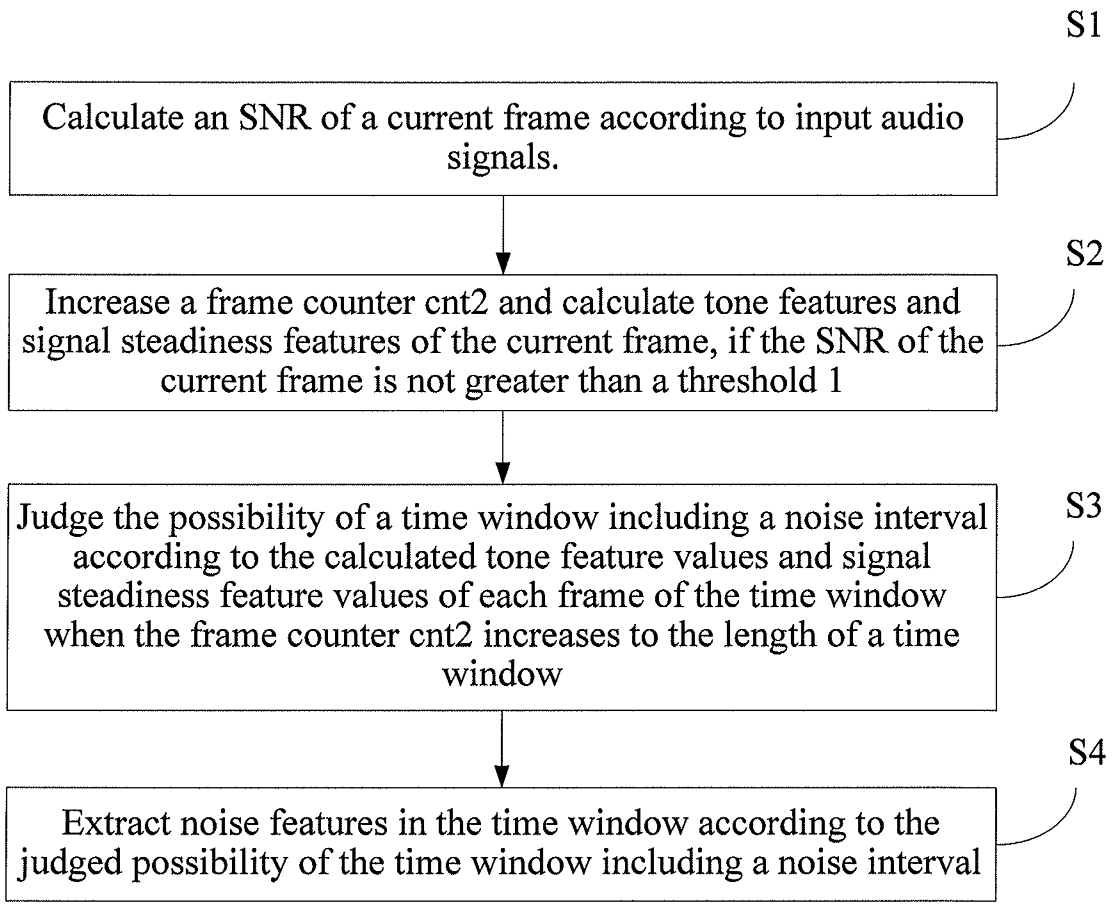
FIG. 1 is a flow chart of a method for tracking background noise in a communication system according to a first embodiment of the embodiment.

Accordingly, in the embodiment of the present disclosure, a method for tracking background noise in a communication system is provided, so as to solve the problem that the tracking speed of the conventional background noise tracking techniques is low in scenarios in which the background noise changes dramatically, and to solve the problem that the conventional background noise tracking techniques perform the tracking mistakenly when music signals exist. Referring to FIG. 1, the method includes the following steps:

Step S1: Calculate an SNR of a current frame according to input audio signals.

Step S2: If the SNR of the current frame is greater than or equal to a first threshold, a frame counter cnt2 is increased, and calculates tone features and signal steadiness features of the current frame.

Calculating the tone features includes, but is not limited to, extracting a maximum PVR of a spectrum, a linear combination of local PVRs of the spectrum, the number of local peaks of the spectrum, the number of local peaks of a part of the spectrum, a maximum Peak to Valley Ratio (PAR) of the spectrum, and a linear combination of local PARs of the spectrum. Calculating the signal steadiness features includes, but is not limited to, extracting a total energy fluctuation, a sub-band energy fluctuation, a spectrum maximum peak position fluctuation, a spectrum maximum PVR position fluctuation, and multiple spectrum local peak position fluctuations.

Step S3: When the frame counter cnt2 is increased to the length of a time window, determine the possibility of the time window including a noise interval according to the calculated tone feature values and signal steadiness feature values of each frame of the time window.

The possibility of the time window including a noise interval refers to whether the time window includes noise, and the position of the included noise. An audio frame in a time window may have the following possibility of a noise interval: the current frame is a noise frame, or a noise frame exists.

Step S4: Extract noise features in the time window according to the determined possibility of the time window including a noise interval.

If the current frame is a noise frame, the noise features of the current frame can be extracted directly. When the noise frame exists, specifically, all intervals may be noise intervals, or most of the intervals are noise intervals and only a small number of the intervals are non-noise intervals. Noise features are extracted according to different situations.

In the method according to the embodiment of the present disclosure, existence of the background noise is analyzed continuously in the time window of a certain length, so that the background noise that changes frequently and dramatically can be detected or tracked rapidly. Meanwhile, the tone features, the spectrum peak position steadiness, and the maximum PVR position steadiness are detected, thus significantly reducing the miss-tracking phenomenon of background noise in music signals.

The method according to the above embodiment of the present disclosure is described in detail in the following embodiments.

Embodiment 2

Figure 2A:
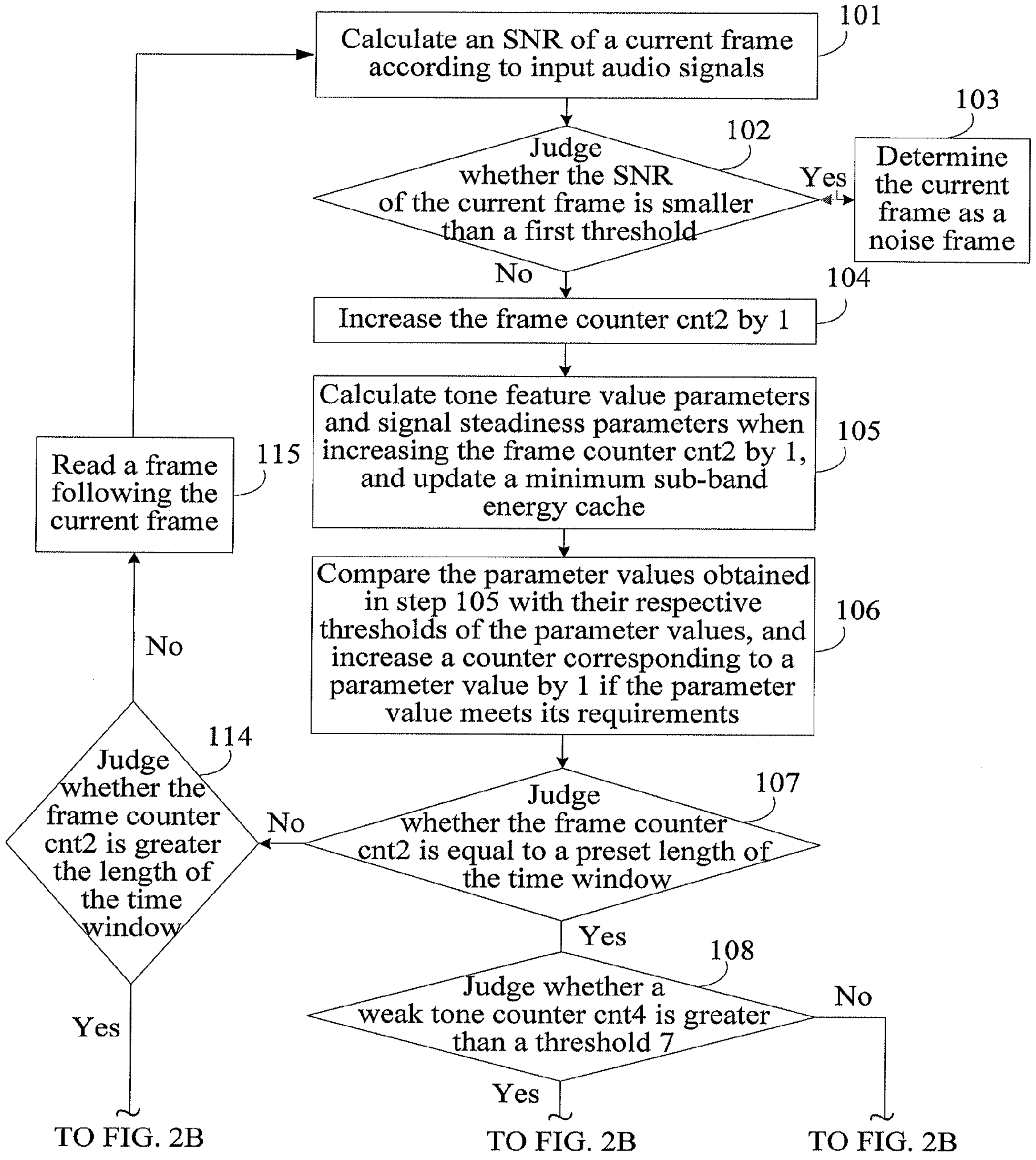
FIGS. 2A and 2B are flow charts of a method for tracking background noise in a communication system according to a second embodiment of the embodiment.
Figure 2B:
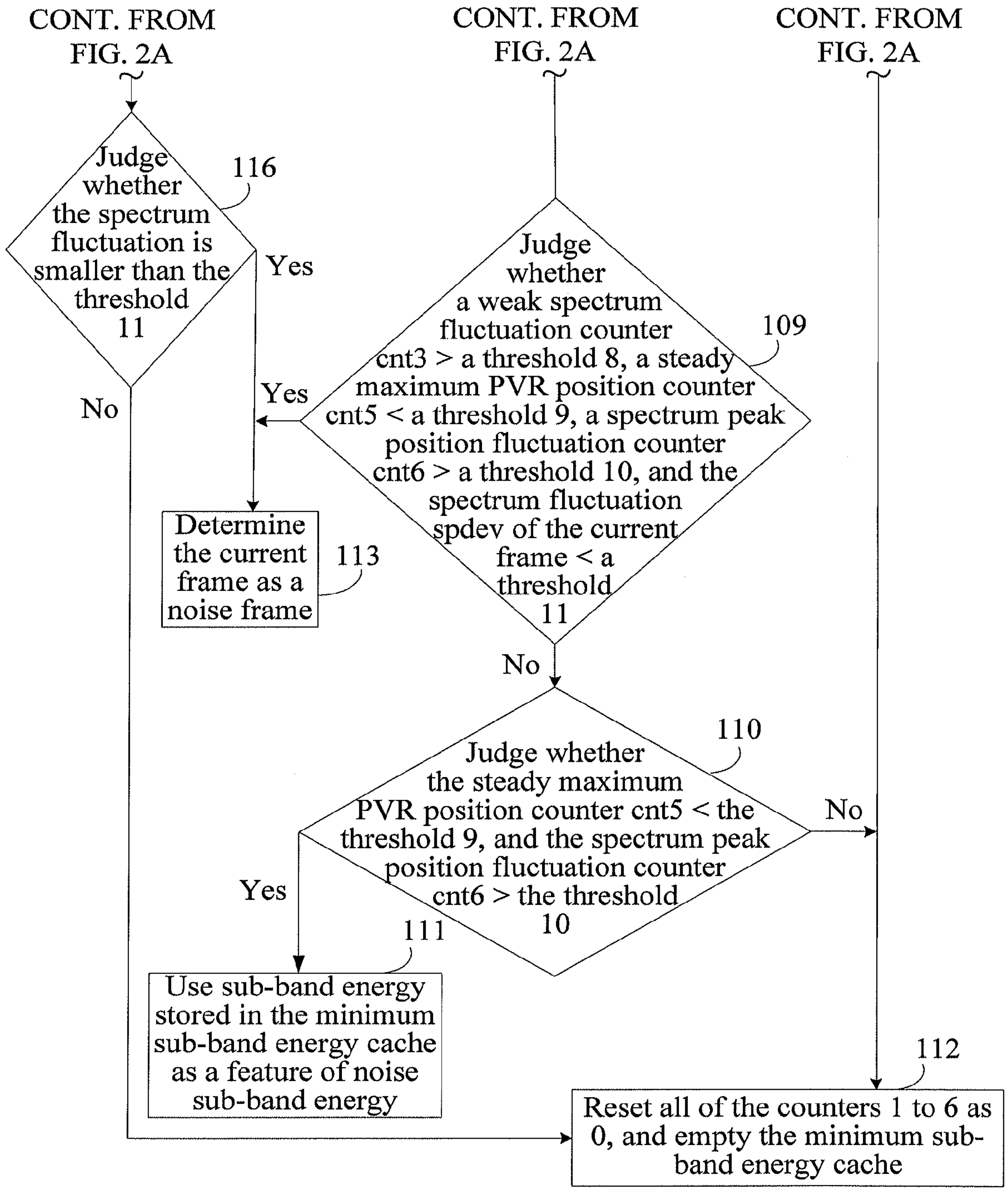

In order to solve the problem that the tracking speed of the conventional background noise tracking techniques is low in scenarios in which the background noise changes dramatically, and to solve the problem that the conventional background noise tracking techniques perform the tracking mistakenly when music signals exist, a method for tracking background noise in a communication system is provided in the embodiment of the present disclosure. Referring to FIGS. 2A and 2B, the method includes the following steps:

Step 101: Calculate an SNR of a current frame according to input audio signals.

Figure 4:
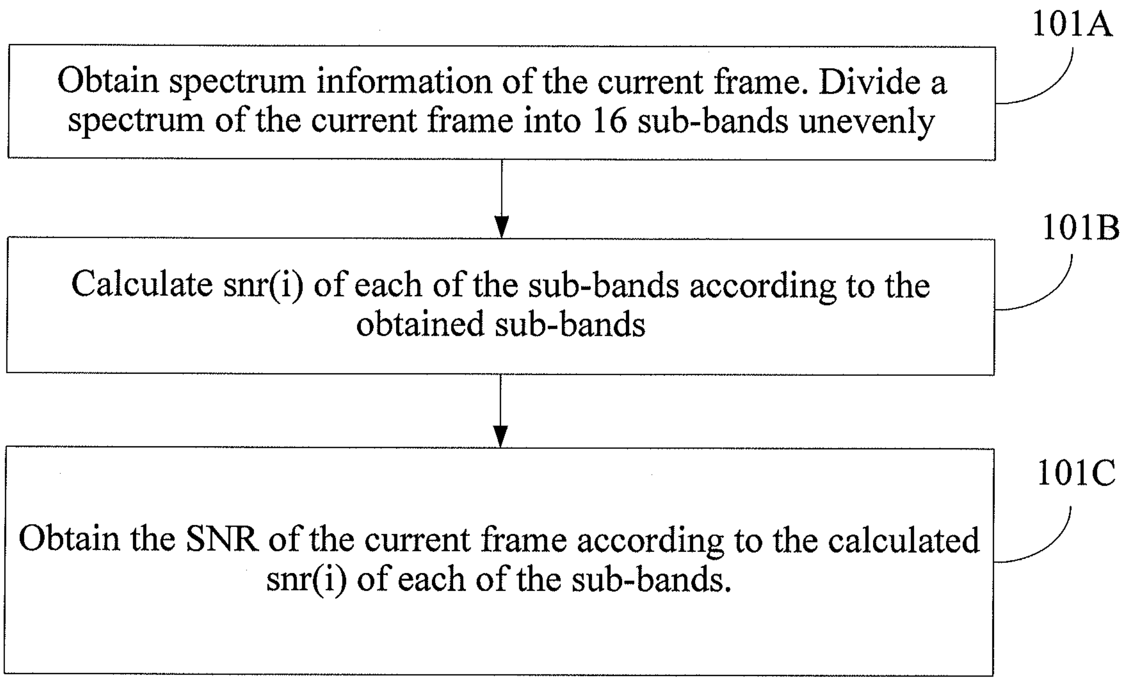
FIG. 4 is a flow chart of a method for calculating the SNR as recited in FIG. 2A.

For the input audio signals, each of the audio signals is transmitted in the form of a frame format. Firstly, calculation of an SNR on a current frame is required. See FIG. 4, the calculating the SNR recited in the Step 101 further comprises:

Step 101A: Obtain spectrum information of the current frame. Divide a spectrum of the current frame into 16 sub-bands unevenly.

In this embodiment, the spectrum of the current frame is divided into the 16 sub-bands unevenly, which is an example used for description. During specific implementation, the division may be performed evenly, which is not limited by this embodiment. In addition, during specific implementation, the number of the divided sub-bands is not limited by this embodiment. For example, if a high frequency domain resolution is required, the number of the sub-bands may be increased appropriately, but the complexity of the calculation is increased accordingly. In specific applications, selection may be made according to actual needs of technicians, and this embodiment does not limit the selection.

Step 101B: Calculate snr(i) of each of the sub-bands according to the obtained sub-bands.

And, snr(i)=Es(i)/En(i); snr(i) represents an SNR of an $i^{th}$ sub-band of the current frame, Es(i) represents energy of the $i^{th}$ sub-band of the current frame, and En(i) represents energy of the $i^{th}$ sub-band of estimation of background noise.

Step 101C: Obtain the SNR of the current frame according to the calculated snr(i) of each of the sub-bands.

The SNR of the current frame represents a sum of snr(i) of all of the sub-bands, that is, SNR=Σsnr(i).

Step 102: Determine whether the SNR of the current frame is less than a first threshold. If the SNR of the current frame is less than a first threshold, the procedure proceeds to step 103; if the SNR of the current frame is greater than or equal to a first threshold, the procedure proceeds to step 104.

The first threshold may be a noise threshold, and a value of the first threshold may be small. Normally, the unit of the value of the SNR is decibel (dB), and correspondingly, the unit of the value of the first threshold is also dB. However, during specific implementation, the unit of the value of the threshold is not limited.

Step 103: Determine the current frame as a noise frame.

Furthermore, in order to prevent an ending part of a voice whose energy is low from being mistaken for background noise, because the energy of the ending part of the voice is low, the SNR of the ending part may be less than the first threshold, and accordingly, step 103 further includes the following steps: A continuous noise counter cnt1 is increased by 1, and then whether the continuous noise counter cnt1 is greater than a second threshold is determined. If the continuous noise counter cnt1 is greater than a second threshold, the current frame is determined as a noise frame; if the continuous noise counter cnt1 is not greater than a second threshold, the current frame is determined as the ending of the voice, and the procedure ends.

Step 104: The SNR of the current frame is greater than or equal to the first threshold, and increase the frame counter cnt2 by 1.

Step 105: When the frame counter cnt2 is increased by 1, calculate tone feature value parameters and signal steadiness parameters of the current frame; and update a minimum sub-band energy cache.

The above tone feature value parameters include, but are not limited to, a maximum PVR of a spectrum, a linear combination of local PVRs of the spectrum, the number of local peaks of the spectrum, the number of local peaks of a part of the spectrum, a maximum PAR of the spectrum, and a linear combination of local PARs of the spectrum. Preferably, in this embodiment, a sum of largest three normalized PVRs of the spectrum is used to represent the tone feature value. The details are as follows:

tonal=$PVR_{max1}$+$PVR_{max2}$+$PVR_{max3}$ where $PVR_{max1,2,3}$ represents the largest three normalized PVRs of the spectrum of the current frame. The normalized PVR satisfies PVR=[(peak−$val_l$)+(peak−$val_r$)]/$E_{avg}$, where peak represents a local peak of a Fast Fourier Transform (FFT) spectrum, $val_l$ represents a minimum value found within a range of 4 frequency points to the left of the FFT spectrum peak peak, $val_r$ represents a minimum value found within a range of 4 frequency points to the right of the FFT spectrum peak peak, $val_l$ and $val_r$ represent local valleys that are on the two sides of peak and are nearest to the peak, and $E_{avg}$ represents an average value of FFT spectrum energy.

The above signal steadiness parameters include, but are not limited to, a total energy fluctuation, a sub-band energy fluctuation, a spectrum maximum peak position fluctuation, a spectrum maximum PVR position fluctuation, and multiple spectrum local peak position fluctuations. Preferably, in this embodiment, a spectrum fluctuation value, a spectrum peak position fluctuation value of the current frame, and a fluctuation value of the maximum PVR position of the spectrum of the current frame are taken as an example for illustration. The details are as follows:

(1) The method for calculating the spectrum fluctuation value (spdev) is as follows:

$$spdev = \frac{1}{N}\sum_i (E_w(i) - M)^2,$$

where M is an average value of $E_w(i)$, $E_w(i)$ is energy of the $i^{th}$ sub-band after spectral subtraction; $E_w(i)=E_s(i)/E_{avg}(i)$, where $E_s(i)$ represents energy of the $i^{th}$ sub-band of the current frame, $E_{avg}$ (i) represents an energy slide average of the $i^{th}$ sub-band; and $E_{avg}=\alpha\cdot E_{avg}(i)+(1-\alpha)\cdot E_s(i)$, where α is a for getting coefficient.

(2) The spectrum peak position fluctuation value ($p_{flux}$) of the current frame represents a fluctuation of the FFT spectrum maximum peak position before and after the change, and the method for the calculation is as follows:

$p_{flux}=idx_{pmax}(0)-idx_{pmax}(-1)$, where $idx_{pmax}(0)$ represents an FFT frequency point index of the spectrum maximum peak of the current frame, and $idx_{pmax}(-1)$ represents an FFT frequency point index of the spectrum maximum peak of a previous frame, wherein the previous frame referenced here refers to a frame previous to the current frame (3) The spectrum maximum PVR position fluctuation value ($Mp_{flux}$) represents a fluctuation of the FFT spectrum peak position with the maximum PVR in the frame before and after the change, and the method for the calculation is as follows:

$Mp_{flux}=idx_{pvrmax}(0)-idx_{pvrmax}(-1)$, where $idx_{pvrmax}(0)$ represents an FFT frequency point index with the maximum PVR of the current frame, $idx_{pvrmax}(-1)$ represents an FFT frequency point index with the maximum PVR of a previous frame, and the method for calculating the PVR pvr is: $pvr=4\cdot E_{idx\_peak}-(E_{idx\_peak-1}+E_{idx\_peak-2}+E_{idx\_peak+1}+E_{idx\_peak+2})$, where $E_{idx\_peak}$ represents energy of the local peak peak, $E_{idx\_peak-i}$ represents energy of an $i^{th}$ FFT frequency point to the left of peak, and $E_{idx\_peak+i}$ represents energy of an $i^{th}$ FFT frequency point to the right of peak.

The objective of the update of the minimum sub-band energy cache in Step 105 is to store a minimum energy value of each of the sub-bands of a current time window.

Figure 5:
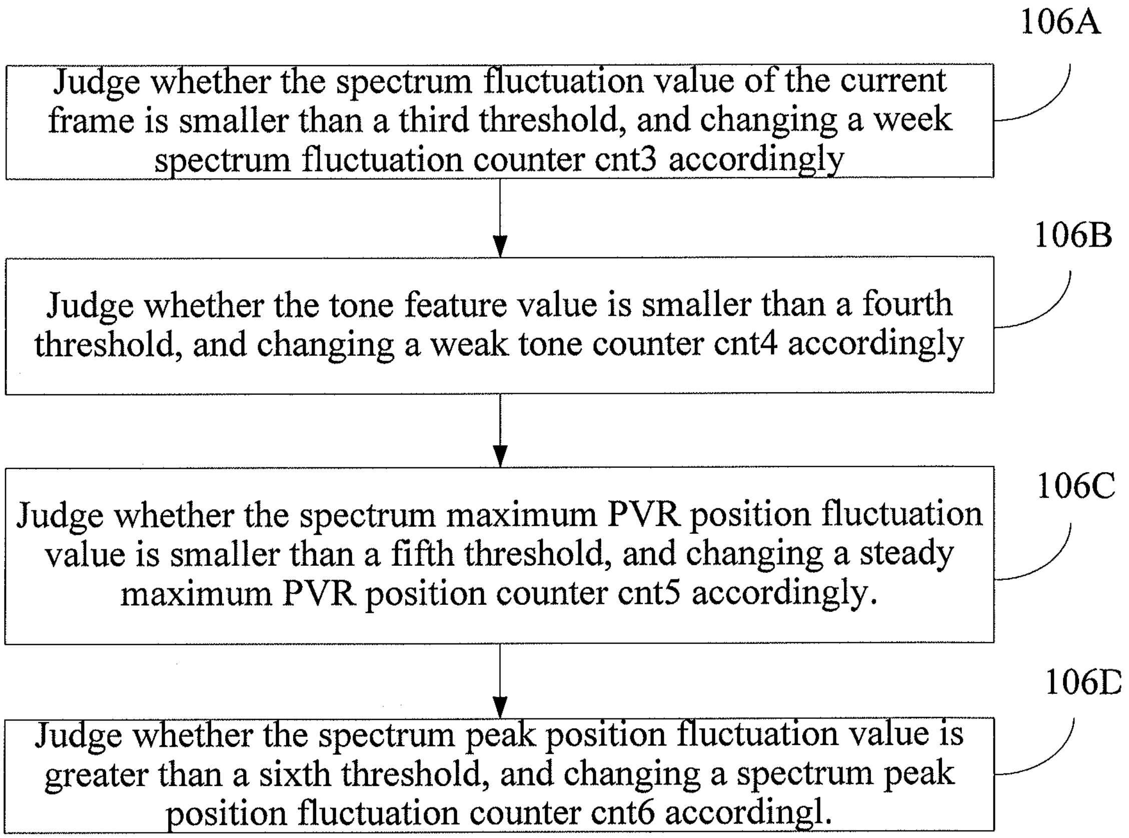
FIG. 5 is a flow chart of a detailed method for performing the Step 105 as recited in FIG. 2A.

Step 106: Compare the parameter values obtained in step 105 with respective thresholds of the parameter values, and increase a counter corresponding to a parameter value by 1 if the parameter value meets its requirements. See FIG. 5, the details are as follows:

Step 106A: Determine whether the spectrum fluctuation value of the current frame obtained in step 105 is less than a third threshold. If the spectrum fluctuation value is less than a third threshold, increase a weak spectrum fluctuation counter cnt3 by 1; if the spectrum fluctuation value is greater than or equal to a third threshold, do not change the weak spectrum fluctuation counter cnt3.

Step 106B: Determine whether the tone feature value obtained in step 105 is less than a fourth threshold. If the tone feature value is less than a fourth threshold, increase a weak tone counter cnt4 by 1; if the tone feature value is greater than or equal to a fourth threshold, do not change the weak tone counter cnt4.

Step 106C: Determine whether the spectrum maximum PVR position fluctuation value obtained in step 105 is less than a fifth threshold. If the spectrum maximum PVR position fluctuation value is less than a fifth threshold, increase a steady maximum PVR position counter cnt5 by 1; if the spectrum maximum PVR position fluctuation value is greater than or equal to a fifth threshold, do not change the steady maximum PVR position counter cnt5.

Step 106D: Determine whether the spectrum peak position fluctuation value obtained in step 105 is greater than a sixth threshold. If the spectrum peak position fluctuation value is greater than a sixth threshold, increase a spectrum peak position fluctuation counter cnt6 by 1; if the spectrum peak position fluctuation value obtained in step 105 is not greater than a sixth threshold, do not change the spectrum peak position fluctuation counter cnt6.

Preferably, a value of the above third threshold may be 12, a value of the above fourth threshold may be 15, a value of the above fifth threshold may be 1, and a value of the above sixth threshold may be 0. This embodiment does not limit the value or unit of each of the thresholds, and the value and unit of each of the thresholds are set according to actual applications.

Step 107: Determine whether the value of the frame counter cnt2 is equal to a preset length of the time window. If the value of the frame counter cnt2 is equal to a preset length of the time window, the procedure proceeds to step 108; if the value of the frame counter cnt2 is unequal to a preset length of the time window, the procedure proceeds to step 114.

The objective of the frame counter cnt2 is to establish a time window. In this embodiment, the length of the time window is preset to 30. That is, the time window is of the length of 30 frames, which is equivalent to the value of the frame counter cnt2 reaches 30. In this embodiment, in each of the time windows, signal features are analyzed, so that features of possible background noise can be extracted.

Step 108: Determine whether the weak tone counter cnt4 is greater than a seventh threshold. If the weak tone counter cnt4 is greater than a seventh threshold, the procedure proceeds to step 109; if the weak tone counter cnt4 is not greater than a seventh threshold, the procedure proceeds to step 112.

Step 109: If the weak tone counter cnt4 is greater than the seventh threshold, determine that a noise frame exists in the past 30 frames, and determine whether the following conditions are met at the same time: the weak spectrum fluctuation counter cnt3>a eighth threshold, the steady maximum PVR position counter cnt5<a ninth threshold, the spectrum peak position fluctuation counter cnt6>a first threshold, and the spectrum fluctuation spdev of the current frame<a eleventh threshold. If the following conditions are met at the same time, the procedure proceeds to step 113; if the following conditions are not met at the same time, the procedure proceeds to step 110.

Step 110: Determine whether the following conditions are met at the same time: the steady maximum PVR position counter cnt5<the ninth threshold, and the spectrum peak position fluctuation counter cnt6>the first threshold. If the conditions are met at the same time, the procedure proceeds to step 111; if the following conditions are not met at the same time, the procedure proceeds to step 112.

Step 111: Use sub-band energy stored in the minimum sub-band energy cache as a feature of noise sub-band energy. If the procedure already proceeds to step 111, it means that the past 30 frames at least include a noise frame, and the sub-band energy stored in the minimum sub-band energy cache is used as the noise feature.

Step 112: Preset all of the counters 1 to 6 to 0, and empty the minimum sub-band energy cache. If the procedure already proceeds to step 112, it means that the past 30 frames do not include a noise frame.

Step 113: Determine the current frame as a noise frame. If the procedure already proceeds to step 113, it can be determined that the current frame is a noise frame.

Step 114: Determine whether the frame counter cnt2 is greater than 30. If the frame counter cnt2 is greater than 30, the procedure proceeds to step 115; if the frame counter cnt2 is not greater than 30, the procedure proceeds to step 116.

Step 115: Read a frame following the current frame further, and the procedure proceeds to step 101.

Step 116: Determine whether the spectrum fluctuation is less than the eleventh threshold. If the spectrum fluctuation is less than the eleventh threshold, the procedure proceeds to step 113, in which the current frame is determined as a noise frame; if the spectrum fluctuation is greater than or equal to the eleventh threshold, the procedure proceeds to step 112, in which all of the counters 1 to 6 are reset to 0, and the minimum sub-band energy cache is emptied.

If the current frame is a non-noise frame, the noise features of the time window may not be required to be extracted. If the current frame is a noise frame, the feature values of the noise frame can be extracted directly. If it is determined that the time window includes a noise frame, a following method may be used to extract the noise features of the time window, and the details of the method are as follows.

Furthermore, if it is determined that the time window includes a noise frame, a type of background noise intervals included in the time window can be determined according to the above tone feature statistics and signal steadiness statistics (that is, all intervals are the noise intervals, or most of the intervals are the noise intervals and only a small number of the intervals are the non-noise intervals). The details are as follows:

(1) It is determined whether the intervals in the time window including the background noise intervals are all the noise intervals. For example, it is determined whether the weak spectrum fluctuation counter cnt3 is equal to the length of the time window according to the weak spectrum fluctuation counter cnt3. If the weak spectrum fluctuation counter cnt3 is equal to the length of the time window, it is determined that the intervals in the time window including the background noise intervals are all the noise intervals; if the weak spectrum fluctuation counter cnt3 is unequal to the length of the time window, it is determined that not all of the intervals in the time window including the background noise intervals are the noise intervals.

(2) It is determined whether in the time window including the background noise intervals, most of the intervals are the noise intervals and only a small number of the intervals are the non-noise intervals. For example, it is determined whether the weak spectrum fluctuation counter cnt3 is less than the length of the time window and greater than a preset value (the preset value is an empirical value according to actual needs in the art) according to the weak spectrum fluctuation counter cnt3, if yes, it is determined that in the time window, most of the intervals are the noise intervals and only a small number of the intervals are the non-noise intervals.

(3) It is determined that the time window does not include a noise interval. As stated above, if the procedure already proceeds to step 112, it means that the past 30 frames do not include a noise frame.

Furthermore, if it is determined that in the time window including the background noise intervals, most of the intervals are the noise intervals and only a small number of the intervals are the non-noise intervals, the following judgment is required. Positions of the small number of the non-noise intervals in the time window are determined. For example, it is determined whether the small number of the non-noise intervals are at a front end of the time window, or whether the small number of the non-noise intervals are at a rear end of the time window, or whether the small number of the non-noise intervals are at both of the two ends of the time window. The method is as follows: A frame that cannot make the weak spectrum fluctuation counter cnt3 increase by 1 is obtained. Position information of the obtained frame is obtained. A position of the frame in the time window is obtained according to the obtained position information. For example, during processing, relevant information of each frame of an input audio signal is recorded in a cache. For example, a frame can make the weak spectrum fluctuation counter cnt3 increase by 1 is marked as "1" in the cache, and a frame can not make the weak spectrum fluctuation counter cnt3 increase by 1 is marked as "0" in the cache. Accordingly, in this case, the position information of the frame that cannot make the weak spectrum fluctuation counter cnt3 increase by 1 can be obtained according to the relevant contents recorded in the cache, so that the positions of the small number of the non-noise intervals in the time window can be obtained.

When features of background noise are required to be extracted, the method according to the embodiment of the present disclosure further includes the following steps:

(1) When the intervals in the time window including the background noise intervals are all the noise intervals, the features of the background noise are extracted according to actual needs. For example, feature values of the noise interval at the very rear end of the time window are extracted as the features of the background noise in the time window; or, average values of the features of all of the noise intervals in the time window are extracted as the features of the background noise in the time window; or, weighted feature values of a part of or all of the noise intervals in the time window are extracted as the features of the background noise in the time window. The embodiment of the present disclosure does not limit the method for the extracting.

(2) When in the time window including the background noise intervals most of the intervals are the noise intervals and only a small number of the intervals are the non-noise intervals, the method according to the embodiment of the present disclosure further includes the following steps:

(a) If the non-noise intervals are not at the rear end of the time window, the feature values of the noise interval at the very rear end of the time window are extracted as the features of the background noise in the time window; or weighted feature values of a part of the noise intervals close to the rear end of the time window are extracted as the features of the background noise in the time window.

(b) If the non-noise intervals are at the rear end of the time window, the smallest feature values in the time window are extracted as the features of the background noise in the time window; or weighted feature values of a part of the noise intervals are extracted as the features of the background noise in the time window.

In view of the above, in the method according to the embodiment of the present disclosure, existence of the background noise is analyzed continuously in the time window of a certain length, so that the background noise that changes frequently and dramatically can be detected or tracked rapidly. Meanwhile, the tone features, the spectrum peak position steadiness, and the maximum PVR position steadiness are detected, thus significantly reducing the miss-tracking phenomenon of background noise in music signals.

Embodiment 3

Figure 3:
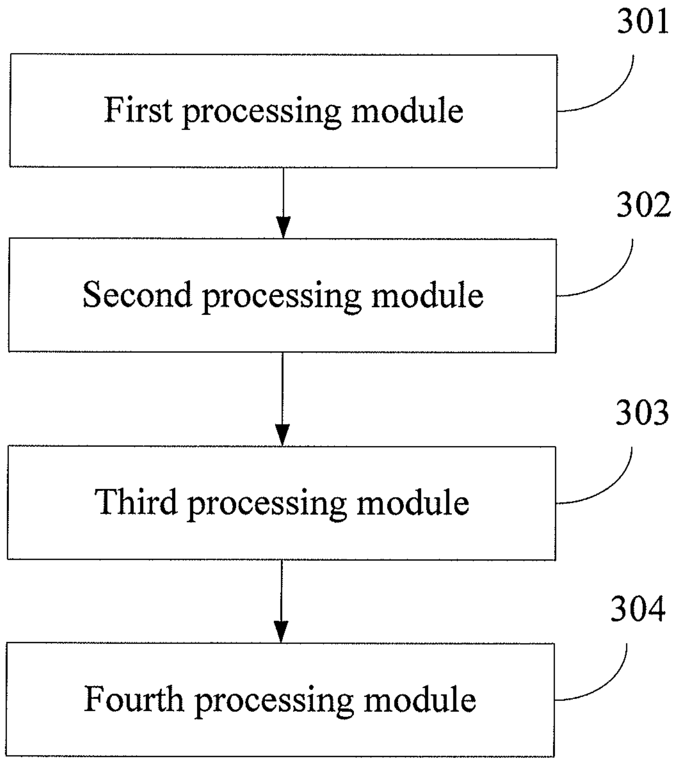
FIG. 3 is a flow chart of a device for tracking background noise in a communication system according to a third embodiment of the embodiment.

Accordingly, a device for tracking background noise in a communication system according to the embodiment of the present disclosure is provided. Referring to FIG. 3, the device includes: a first processing module 301, configured to calculate an SNR of a current frame according to input audio signals; a second processing module 302, configured to increase a frame counter cnt2, and calculate tone features and signal steadiness features of the current frame if the SNR of the current frame is greater than or equal to a first threshold; a third processing module 303, configured to determine the possibility of a time window including a noise interval according to the calculated tone feature values and signal steadiness feature values of each frame of the time window when the frame counter cnt2 is increased to the length of the time window; and a fourth processing module 304, configured to extract noise features in the time window according to the determined possibility of the time window including a noise interval. The device may be a server having a processor and storage medium that is accessible to the processor.

The first processing module 301 includes: a dividing unit, configured to obtain spectrum information of the current frame according to the input audio signals, and divide the spectrum of the current frame into multiple sub-bands; a sub-band calculating unit, configured to calculate an SNR snr(i) of each of the sub-bands according to the obtained sub-bands; and an obtaining unit, configured to obtain the SNR of the current frame according to the calculated snr(i) of each of the sub-bands.

The second processing module 302 includes: a threshold determining unit, configured to determine whether the SNR of the current frame is greater than a first threshold; a frame counter increasing unit, configured to increase the frame counter cnt2 if a determining result of the determining unit is negative; and a calculating unit, configured to calculate a spectrum fluctuation value of the current frame, tone feature values of the current frame, a spectrum peak position fluctuation value of the current frame, and a spectrum maximum PVR position fluctuation value of the current frame.

The third processing module 303 further includes: an increasing unit, configured to increase a weak spectrum fluctuation counter cnt3 if the spectrum fluctuation value of the current frame is less than a third threshold; increase a weak tone counter cnt4 if the tone feature values of the current frame are less than a fourth threshold; increase a steady maximum PVR position counter cnt5 if the spectrum maximum PVR position fluctuation value of the current frame is less than a threshold value 5; and increase a spectrum peak position fluctuation counter cnt6 if the spectrum peak position fluctuation value of the current frame is greater than a threshold value 6; and a determining unit, configured to determine whether the time window includes a noise frame according to the spectrum fluctuation value, the tone feature values, the spectrum maximum PVR position fluctuation value, the spectrum peak position fluctuation value of the current frame, and all of the counters.

The determining unit is specifically configured to determine that the time window does not include a noise frame if the weak tone counter cnt4 is greater than the seventh threshold; determine that the current frame is a noise frame if the weak tone counter cnt4 is not greater than the seventh threshold, the weak spectrum fluctuation counter cnt3 is greater than the eighth threshold, the steady maximum PVR position counter cnt5 is less than the ninth threshold, the spectrum peak position fluctuation counter cnt6 is greater than the tenth threshold, and the spectrum fluctuation value of the current frame is less than the eleventh threshold; otherwise determine that the time window includes a noise frame if the steady maximum PVR position counter cnt5 is less than the ninth threshold, and the spectrum peak position fluctuation counter cnt6 is greater than the tenth threshold; and otherwise determine that the time window does not include a noise frame.

The third processing module 303 is specifically configured to determine that intervals in the time window are all noise intervals if the weak spectrum fluctuation counter cnt3 is equal to the length of the time window; and determine that most of the intervals in the time window are the noise intervals and a small number of the intervals in the time window are non-noise intervals if the weak spectrum fluctuation counter cnt3 is less than the length of the time window and greater than a preset length; The third processing module 303 is further configured to determine that the time window does not include a noise frame, if none of the abovementioned condition is satisfied.

If most of the intervals in the time window are the noise intervals and a small number of the intervals in the time window are the non-noise intervals, the third processing module 303 further includes a position type determining unit. The position type determining unit is configured to determine a type of a position of the small number of the non-noise intervals in the time window. The types of the position include: a front end of the time window, a rear end of the time window, and the two ends of the time window.

The position type determining unit is specifically configured to obtain a frame that cannot make the weak spectrum fluctuation counter cnt3 increase according to the weak spectrum fluctuation counter cnt3, obtain a position of the frame according to the obtained frame, and obtain the type of the position of the small number of the non-noise intervals in the time window according to the position.

If the intervals in the time window are all the noise intervals, the fourth processing module 304 is specifically configured to extract feature values of the noise interval at the very rear end of the time window, or extract average values of the features of all of the noise intervals in the time window, or extract weighted feature values of a part of or all of the noise intervals in the time window. If most of the intervals in the time window are the noise intervals and a small number of the intervals are the non-noise intervals, the fourth processing module 304 is specifically configured to extract the feature values of the noise interval at the very rear end of the time window, or extract weighted feature values of a part of the noise intervals near the rear end in the time window if the non-noise intervals are not at the rear end of the time window; or extract a smallest value of the noise features in the time window, or extract weighted feature values of a part of the noise intervals if the non-noise intervals are at the rear end of the time window.

When the frame counter cnt2 is greater than the length of the time window, the third processing module is further configured to determine that the current frame is a noise frame if the spectrum fluctuation value of the current frame is less than the eleventh threshold; and otherwise determine that current frame is a non-noise frame.

In view of the above, in the device according to the embodiment of the present disclosure, existence of the background noise is analyzed continuously in the time window of a certain length, so that the background noise that changes frequently and dramatically can be detected or tracked rapidly. Meanwhile, the tone features, the spectrum peak position steadiness, and the maximum PVR position steadiness are detected, thus significantly reducing the miss-tracking phenomenon of background noise in music signals.

In the embodiments of the present disclosure, the word "obtain" may refer to obtaining information from other modules in an active manner, and may also refer to receiving information sent by other modules.

It should be understood by persons skilled in the art that the accompanying drawings are merely schematic diagrams of a preferred embodiment, and modules or processes in the accompanying drawings are not necessarily required in implementing the present disclosure.

It should be understood by persons skilled in the art that, modules in a device according to an embodiment may be distributed in the device of the embodiment according to the description of the embodiment, or be correspondingly changed to be disposed in one or more devices different from this embodiment. The modules of the above embodiment may be combined into one module, or further divided into a plurality of sub-modules.

The sequence numbers of the above embodiments of the present disclosure are merely for the convenience of description, and do not imply the preference among the embodiments.

A part of the steps according to the embodiments of the present disclosure may be implemented by software, and the corresponding software program may be stored in readable storage medium, such as an optical disk or a hard disk.

The above descriptions are merely preferred embodiments of the present disclosure, but are not intended to limit the present disclosure. Any modification, equivalent replacement, or improvement made without departing from the spirit and principle of the present disclosure should fall within the scope of the present disclosure.

What is claimed is:

1. A method for tracking background noise in a communication system, comprising:

calculating a Signal to Noise Ratio (SNR) of a current frame according to input audio signals;

increasing a frame counter cnt2 and calculating values for tone feature and signal steadiness features of the current frame if the SNR of the current frame is greater than or equal to a first threshold;

determining the possibility of a time window comprising a noise interval according to the tone feature value and the signal steadiness feature values of each frame of the time window when the frame counter cnt2 is increased to the length of the time window; and extracting noise features in the time window according to the determined possibility of the time window comprising a noise interval, wherein calculating values for tone features and signal steadiness features of the current frame comprises: calculating the tone feature values of the current frame, a spectrum fluctuation value spdev of the current frame, a spectrum peak position fluctuation value of the current frame, and a spectrum maximum Peak to Valley Ratio (PVR) position fluctuation value of the current frame, wherein calculating the tone feature value of the current frame comprises: calculating a sum of the largest three normalized PVRs of the spectrum according to a formula of $tonal=PVR_{max1}+PVR_{max2}+PVR_{max3}$, where $PVR_{max1}$, $PVR_{max2}$, and $PVR_{max3}$ represent the largest three normalized PVRs of the spectrum of the current frame, each normalized PVR satisfies $PVR=[(peak-val_l)+(peak-val_r)]/E_{avg}$, where peak represents a local peak of a Fast Fourier Transform (FFT) spectrum, $val_l$ represents a minimum value found within a range of 4 frequency points to the left of the FFT spectrum peak, $val_r$ represents a minimum value found within a range of 4 frequency points to the right of the FFT spectrum peak, $val_l$ and $val_r$ represent local valleys that are on the two sides of peak and are the nearest to peak, and $E_{avg}$ represents an average value of the FFT spectrum energy, wherein calculating the spectrum fluctuation value spdev of the current frame comprises: calculating the spectrum fluctuation value spdev according to the formula of $$spdev = \frac{1}{N}\sum_i (E_w(i) - M)^2,$$

where M is an average value of $E_w(i)$, $E_w(i)$ is energy of an $i^{th}$ sub-band after spectral subtraction according to $E_w(i)=E_s(i)/E_{avg}(i)$, where $E_s(i)$ represents energy of the $i^{th}$ sub-band of the current frame, $E_{avg}(i)$ represents an energy slide average of the $i^{th}$ sub-band; and $E_{avg}$ is calculated according to the formula of $E_{avg}(i)=\alpha\cdot E_{avg}(i)+(1-\alpha)\cdot E_s(i)$, where $\alpha$ is a forgetting coefficient, wherein calculating the spectrum peak position fluctuation value $P_{flux}$ of the current frame comprises: calculating the spectrum peak position fluctuation value $P_{flux}$ of the current frame according to the formula of $P_{flux}=idx_{pmax}(0)-idx_{pmax}(-1)$, where $idx_{pmax}(0)$ represents an FFT frequency point index of the spectrum maximum peak of the current frame, and $idx_{pmax}(-1)$ represents an FFT frequency point index of the spectrum maximum peak of a previous frame, wherein calculating the spectrum maximum PVR position fluctuation value $Mp_{flux}$ of the current frame comprises: calculating the spectrum maximum PVR position fluctuation value $Mp_{flux}$ of the current frame according to the formula of $Mp_{flux}=idx_{pvrmax}(0)-idx_{pvrmax}(-1)$, where $idx_{pvrmax}(0)$ represents an FFT frequency point index with the maximum PVR of the current frame, and $idx_{pvrmax}(-1)$ represents an FFT frequency point index with the maximum PVR of a previous frame, and wherein $idx_{pvrmax}(0)$ and $idx_{pvrmax}(-1)$ are determined according to pvr values which are calculated by: $pvr=4\cdot E_{idx\_peak}-(E_{idx\_peak-1}+E_{idx\_peak-2}+E_{idx\_peak+1}+E_{idx\_peak+2})$, where $E_{idx\_peak}$ represents energy of the local peak peak, $E_{idx\_peak-i}$ represents energy of an $i^{th}$ FFT frequency point to the left of the peak, and $E_{idx\_peak+i}$ represents energy of an $i^{th}$ FFT frequency point to the right of peak.

2. The method according to claim 1, wherein before determining the possibility of the time window comprising a noise interval, the method further comprises:

increasing a weak spectrum fluctuation counter cnt3 if the spectrum fluctuation value of the current frame is less than a third threshold;

increasing a weak tone counter cnt4 if the tone feature values of the current frame are less than a fourth threshold;

increasing a steady maximum PVR position counter cnt5 if the spectrum maximum PVR position fluctuation value of the current frame is less than a fifth threshold;

increasing a spectrum peak position fluctuation counter cnt6 if the spectrum peak position fluctuation value of the current frame is greater than a sixth threshold; and determining whether the time window comprises a noise frame according to the spectrum fluctuation value, the tone feature values, the spectrum maximum PVR position fluctuation value, the spectrum peak position fluctuation value of the current frame, and all of a plurality of counters, wherein the plurality of counters comprise the frame counter cnt2, the weak spectrum fluctuation counter cnt3, the weak tone counter cnt4, the steady maximum PVR position counter cnt5, and the spectrum peak position fluctuation counter cnt6, and wherein determining whether the time window comprises a noise frame when the frame counter cnt2 is increased to the length of the time window comprises:

if the weak tone counter cnt4 is less than or equal to a seventh threshold, determining that the time window does not comprise a noise frame;

if the weak tone counter cnt4 is greater than the seventh threshold, determining that the current frame is a noise frame if the weak spectrum fluctuation counter cnt3 is greater than an eighth threshold, the steady maximum PVR position counter cnt5 is less than a ninth threshold, the spectrum peak position fluctuation counter cnt6 is greater than a tenth threshold, and the spectrum fluctuation value of the current frame is less than an eleventh threshold; and if the weak tone counter cnt4 is greater than the seventh threshold, determining that the time window comprises a noise frame if the steady maximum PVR position counter cnt5 is less than the ninth threshold and the spectrum peak position fluctuation counter cnt6 is greater than the tenth threshold;

otherwise determining that the time window does not comprise a noise frame, wherein if the time window comprises a noise frame, determining the possibility of the time window comprising a noise interval comprises:

determining that all intervals in the time window are noise intervals if the weak spectrum fluctuation counter cnt3 is equal to the length of the time window; and determining that most of the intervals in the time window are noise intervals and a small number of the intervals in the time window are non-noise intervals if the weak spectrum fluctuation counter cnt3 is less than the length of the time window but greater than a preset length.

3. The method according to claim 2, wherein if most of the intervals in the time window comprising the noise intervals are noise intervals, and a small number of the intervals in the time window comprising the noise intervals are non-noise intervals, the method further comprises:

determining a type of position of the small number of the non-noise intervals in the time window, wherein the type of position comprises: a front end of the time window, a rear end of the time window, or both, wherein determining the type of the position of the small number of the non-noise intervals in the time window comprises:

obtaining a frame that cannot make the weak spectrum fluctuation counter cnt3 increase;

obtaining a position of the frame according to the obtained frame; and obtaining the type of the position of the small number of the non-noise intervals in the time window according to the position, and wherein extracting the noise features of the time window according to the determined possibility of the time window comprising a noise interval comprises:

if the intervals in the time window are all the noise intervals, extracting feature values of the noise interval at the very rear end of the time window; or, extracting average values of the features of all of the noise intervals in the time window; or, extracting weighted feature values of a part of or all of the noise intervals in the time window; and if most of the intervals in the time window are noise intervals and a small number of the intervals are non-noise intervals, performing any one of the steps exposed as: extracting feature values of the noise interval at the very rear end of the time window; or, extracting weighted feature values of a part of the noise intervals close to the rear end in the time window if the non-noise intervals are not at the rear end of the time window; or, extracting a smallest value of the noise features in the time window; or, extracting weighted feature values of a part of the noise intervals if the non-noise intervals are at the rear end of the time window.

4. The method according to claim 1, wherein before determining the possibility of the time window comprising a noise interval, the method further comprises:

increasing one or more counters corresponding to the tone feature value and the signal steadiness feature values that meet their respective requirements according to a result obtained by comparing the tone feature value and the signal steadiness feature values with one or more thresholds corresponding to the tone feature values and/or the signal steadiness feature values.

5. The method according to claim 4, wherein increasing the one or more counters corresponding to the tone feature value and the signal steadiness feature values that meet their respective requirements according to the comparison performed between the tone feature value and the signal steadiness feature values, and the thresholds corresponding to the tone feature value and/or the signal steadiness feature values comprises:

increasing a weak spectrum fluctuation counter cnt3, if the spectrum fluctuation value of the current frame is less than a third threshold;

increasing a weak tone counter cnt4 if the tone feature value of the current frame are less than a fourth threshold;

increasing a steady maximum PVR position counter cnt5 if the spectrum maximum PVR position fluctuation value of the current frame is less than a fifth threshold;

increasing a spectrum peak position fluctuation counter cnt6 if the spectrum peak position fluctuation value of the current frame is greater than a sixth threshold; and determining whether the time window comprises a noise frame according a spectrum fluctuation value, the tone feature value, a spectrum maximum PVR position fluctuation value, a spectrum peak position fluctuation value of the current frame, and all of the one or more counters.

6. The method according to claim 5, wherein determining the possibility of the time window comprising a noise interval according to the calculated tone feature value and the signal steadiness feature values of each frame of the time window when the frame counter cnt2 is increased to the length of the time window comprises:

determining whether the time window comprises a noise frame according to the tone feature value, the signal steadiness feature values, and the counters corresponding to the tone feature value and the signal steadiness feature values when the frame counter cnt2 is increased to the length of the time window; and determining the possibility of the time window comprising a noise interval if the time window comprises a noise frame.

7. The method according to claim 6, wherein determining whether the time window comprises a noise frame when the frame counter cnt2 is increased to the length of the time window comprises:

if the weak tone counter cnt4 is not greater than a seventh threshold, determining that the time window does not comprise a noise frame;

if the weak tone counter cnt4 is greater than the seventh threshold, determining that the current frame is a noise frame if the weak spectrum fluctuation counter cnt3 is greater than a eighth threshold, the steady maximum PVR position counter cnt5 is less than a ninth threshold, and the spectrum peak position fluctuation counter cnt6 is grater than a first threshold, and the spectrum fluctuation value of the current frame is less than a eleventh threshold, determining that the time window comprises a noise frame if the steady maximum PVR position counter cnt5 is less than the ninth threshold and the spectrum peak position fluctuation counter cnt6 is greater than the tenth threshold, otherwise determining that the time window does not comprise a noise frame, wherein if the time window comprises a noise frame, determining the possibility of the time window comprising a noise interval comprises:

determining that all intervals in the time window are noise intervals if the weak spectrum fluctuation counter cnt3 is equal to the length of the time window; and determining that most of the intervals in the time window are noise intervals and a small number of the intervals in the time window are non-noise intervals if the weak spectrum fluctuation counter cnt3 is less than the length of the time window and greater than a preset length, wherein if most of the intervals in the time window comprising the noise intervals are noise intervals, and a small number of the intervals in the time window comprising the noise intervals are non-noise intervals, the method further comprises: determining a type of position of the small number of the non-noise intervals in the time window, wherein the type of position comprises: a front end of the time window, a rear end of the time window, or both, wherein determining the type of position of the small number of the non-noise intervals in the time window comprises:

obtaining a frame that cannot make the weak spectrum fluctuation counter cnt3 increase according to the weak spectrum fluctuation counter cnt3;

obtaining a position of the frame according to the obtained frame; and obtaining the type of the position of the small number of the non-noise intervals in the time window according to the position.

8. The method according to claim 7, wherein extracting the noise features of the time window according to the determined possibility of the time window comprising a noise interval comprises:

if the intervals in the time window are all the noise intervals, extracting feature values of the noise interval at the very rear end of the time window; or, extracting average values of the features of all of the noise intervals in the time window; or, extracting weighted feature values of a part of or all of the noise intervals in the time window; and if most of the intervals in the time window are noise intervals and a small number of the intervals are non-noise intervals, extracting feature values of the noise interval at the very rear end of the time window; or extracting weighted feature values of a part of the noise intervals close to the rear end in the time window if the non-noise intervals are not at the rear end of the time window; or extracting a smallest value of the noise features in the time window; or extracting weighted feature values of a part of the noise intervals if the non-noise intervals are at the rear end of the time window.

9. The method according to claim 1, wherein when the frame counter cnt2 is greater than the length of the time window, the method further comprises:

obtaining a spectrum fluctuation value of the current frame;

determining that the current frame is a noise frame if the spectrum fluctuation value of the current frame is less than a eleventh threshold; and determining that the current frame is a non-noise frame if the spectrum fluctuation value of the current frame is greater than or equal to the eleventh threshold.

10. A device for tracking background noise in a communication system, comprising:

a first processing module, configured to calculate a Signal to Noise Ratio (SNR) of a current frame according to input audio signals;

a second processing module, configured to increase a frame counter cnt2, and calculate values for tone features and signal steadiness features of the current frame if the SNR of the current frame is greater than or equal to a first threshold, wherein the values for tone features and signal steadiness features of the current frame comprises the tone feature values of the current frame, a spectrum fluctuation value spdev of the current frame, a spectrum peak position fluctuation value of the current frame, and a spectrum maximum Peak to Valley Ratio (PVR) position fluctuation value of the current frame;

a third processing module, configured to determine the possibility of a time window comprising a noise interval according to the tone feature values and the signal steadiness feature values of each frame of the time window when the frame counter cnt2 is increased to the length of the time window; and a fourth processing module, configured to extract noise features in the time window according to the determined possibility of the time window comprising a noise interval, wherein, to caculate the tone feature value of the current frame, the second processing module is further configured to calculate a sum of the largest three normalized PVRs of the spectrum according to a formula of $tonal=PVR_{max1}+PVR_{max2}+PVR_{max3}$, where $PVR_{max1}$, $PVR_{max2}$, and $PVR_{max3}$ represent the largest three normalized PVRs of the spectrum of the current frame, each normalized PVR satisfies $PVR=[(peak-val_l)+(peak-val_r)]/E_{avg}$, where peak represents a local peak of a Fast Fourier Transform (FFT) spectrum, $val_l$ represents a minimum value found within a range of 4 frequency points to the left of the FFT spectrum peak, $val_r$ represents a minimum value found within a range of 4 frequency points to the right of the FFT spectrum peak, $val_l$ and $val_r$ represent local valleys that are on the two sides of peak and are the nearest to peak, and $E_{avg}$ represents an average value of the FFT spectrum energy;

to calculate the spectrum fluctuation value spdev of the current frame, the second processing module is further configured to calculate the spectrum fluctuation value spdev according to the formula of $$spdev = \frac{1}{N}\sum_i (E_w(i) - M)^2,$$

where M is an average value of $E_w(i)$, $E_w(i)$ is energy of an $i^{th}$ sub-band after spectral subtraction according to $E_w(i)=E_s(i)/E_{avg}(i)$, where $E_s(i)$ represents energy of the $i^{th}$ sub-band of the current frame, $E_{avg}(i)$ represents an energy slide average of the $i^{th}$ sub-band; and $E_{avg}$ is calculated according to the formula of $E_{avg}(i)=\alpha\cdot E_{avg}(i)+(1-\alpha)\cdot E_s(i)$, where $\alpha$ is a forgetting coefficient;

to calculate the spectrum peak position fluctuation value $P_{flux}$ of the current frame, the second processing module is further configured to calculate the spectrum peak position fluctuation value $P_{flux}$ of the current frame according to the formula of $P_{flux}=idx_{pmax}(0)-idx_{pmax}(-1)$, where $idx_{pmax}(0)$ represents an FFT frequency point index of the spectrum maximum peak of the current frame, and $idx_{pmax}(-1)$represents an FFT frequency point index of the spectrum maximum peak of a previous frame; and to calculate the spectrum maximum PVR position fluctuation value $Mp_{flux}$ of the current frame, the second processing module is further configured to calculate the spectrum maximum PVR position fluctuation value $Mp_{flux}$ of the current frame according to the formula of $Mp_{flux}=idx_{pvrmax}(0)-idx_{pvrmax}(-1)$, where $idx_{pvrmax}(0)$ represents an FFT frequency point index with the maximum PVR of the current frame, and $idx_{pvrmax}(-1)$ represents an FFT frequency point index with the maximum PVR of a previous frame;

wherein, $idx_{pvrmax}(0)$ and $idx_{pvrmax}(-1)$ are determined according to pvr values which are calculated by: $pvr=4\cdot E_{idx\_peak}-(E_{idx\_peak-1}+E_{idx\_peak-2}+E_{idx\_peak+1}+E_{idx\_peak+2})$, where $E_{idx\_peak}$ represents energy of the local peak peak, $E_{idx\_peak-i}$ represents energy of an $i^{th}$ FFT frequency point to the left of peak, and $E_{idx\_peak+i}$ represents energy of an $i^{th}$ FFT frequency point to the right of peak, the device for tracking background noise in a communication system comprises a processor and a storage medium, the storage medium is configured to store stoftware programs, the processor is configured to operate the first processing module, the second processing module, the third processing module and the fourth processing module according to the software programs.

11. The device according to claim 10, wherein the second processing module comprises:

a threshold determining unit, configured to determine whether the SNR of the current frame is greater than the first threshold;

a frame counter increasing unit, configured to increase the frame counter cnt2 if a determining result of the threshold determining unit indicates that the SNR of the current frame is less than or equal to the first threshold; and a calculating unit, configured to calculate a spectrum fluctuation value of the current frame, the tone feature values of the current frame, a spectrum peak position fluctuation value of the current frame, and a spectrum maximum Peak to Valley Ratio (PVR) position fluctuation value of the current frame.

12. The device according to claim 11, wherein the third processing module further comprises:

an increasing unit, configured to:

increase a weak spectrum fluctuation counter cnt3 if the spectrum fluctuation value of the current frame is less than a third threshold;

increase a weak tone counter cnt4 if the tone feature values of the current frame are less than a fourth threshold;

increase a steady maximum PVR position counter cnt5 if the spectrum maximum PVR position fluctuation value of the current frame is less than a threshold value 5; and increase a spectrum peak position fluctuation counter cnt6 if the spectrum peak position fluctuation value of the current frame is greater than a threshold value 6; and a determining unit, configured to:

determine whether the time window comprises a noise frame according to the spectrum fluctuation value, the tone feature values, the spectrum maximum PVR position fluctuation value, the spectrum peak position fluctuation value of the current frame, and one or more counters, wherein the determining unit is configured to determine that the time window does not comprise a noise frame if the weak tone counter cnt4 is greater than a seventh threshold;

determine that the current frame is a noise frame if the weak tone counter cnt4 is greater than the seventh threshold, the weak spectrum fluctuation counter cnt3 is greater than a eighth threshold, the steady maximum PVR position counter cnt5 is less than a ninth threshold, the spectrum peak position fluctuation counter cnt6 is greater than a tenth threshold, and the spectrum fluctuation value of the current frame is less than a eleventh threshold; and determine that the time window comprises a noise frame if the steady maximum PVR position counter cnt5 is less than the ninth threshold, and the spectrum peak position fluctuation counter cnt6 is greater than the tenth threshold;

otherwise determine that the time window does not comprise a noise frame.

13. The device according to claim 12, wherein the third processing module is configured to:

determine that all intervals in the time window are noise intervals if the weak spectrum fluctuation counter cnt3 is equal to the length of the time window; and determine that most of the intervals in the time window are noise intervals and a small number of the intervals in the time window are non-noise intervals if the weak spectrum fluctuation counter cnt3 is less than the length of the time window and greater than a preset length;

otherwise determine that the time window does not comprise a noise frame.

14. The device according to claim 13, wherein if most of the intervals in the time window are noise intervals and a small number of the intervals in the time window are non-noise intervals, then the third processing module further comprises:

a position type determining unit, configured to determine a type of position of the small number of the non-noise intervals in the time window, wherein the type of position comprises: a front end of the time window, a rear end of the time window, or both.

15. The device according to claim 14, wherein the position type determining unit is configured to:

obtain a frame that cannot make the weak spectrum fluctuation counter cnt3 increase according to the weak spectrum fluctuation counter cnt3;

obtain a position of the frame according to the obtained frame; and obtain the type of position of the small number of the non-noise intervals in the time window according to the position of the frame.

16. The device according to claim 14, wherein if the intervals in time window are all the noise intervals, the fourth processing module is configured to extract feature values of the noise interval at the very rear end of the time window; or extract average values of the features of all of the noise intervals in the time window; or extract weighted feature values of a part of or all of the noise intervals in the time window, wherein if most of the intervals in the time window are noise intervals and a small number of the intervals are non-noise intervals, the fourth processing module is configured to extract the feature values of the noise interval at the very rear end of the time window; or extract weighted feature values of a part of the noise intervals near the rear end in the time window if the non-noise intervals are not at the rear end of the time window; or extract a smallest value of the noise features in the time window; or extract weighted feature values of a part of the noise intervals if the non-noise intervals are at the rear end of the time window.

17. The device according to claim 11, wherein if the frame counter cnt2 is greater than the length of the time window, the third processing module is further configured to:

determine that the current frame is a noise frame if the spectrum fluctuation value of the current frame is less than the eleventh threshold; and determine that the current frame is a non-noise frame if the spectrum fluctuation value of the current frame is greater than or equal to the first threshold.

* * * * *

UNITED STATES PATENT AND TRADEMARK OFFICE

CERTIFICATE OF CORRECTION

PATENT NO. : 8,447,601 B2
APPLICATION NO. : 13/325985
DATED : May 21, 2013
INVENTOR(S) : Zhe Wang It is certified that error appears in the above-identified patent and that said Letters Patent is hereby corrected as shown below:

<u>In the Claims</u>

In column 16, claim 7, line 43, before “than a first threshold,” replace “grater” with --greater--.

In column 18, claim 10, line 8, before “the tone feature value” replace “caculate” with --calculate--.

In column 19, claim 10, lines 6-7, after “is configured to store” replace “stoftware” with --software--.

Signed and Sealed this
Twentieth Day of August, 2013

Teresa Stanek Rea
*Acting Director of the United States Patent and Trademark Office*